No. 834,103. PATENTED OCT. 23, 1906.
F. BEVAN.
CORNER JOINT FOR CAR FRAMES AND THE LIKE.
APPLICATION FILED FEB. 13, 1906.
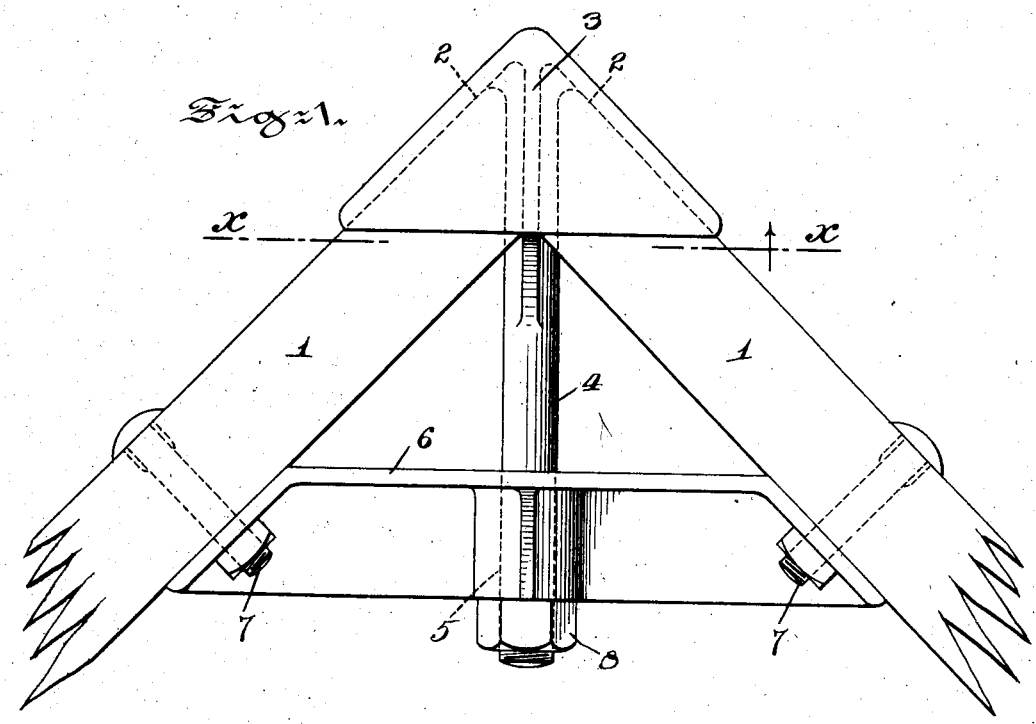
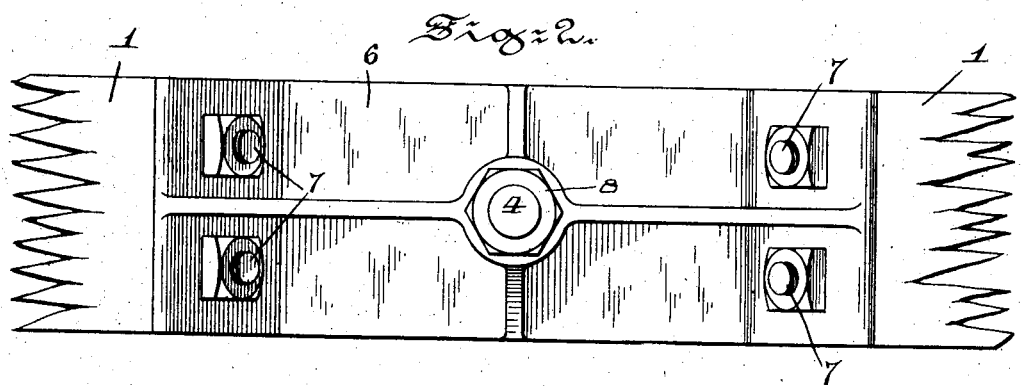
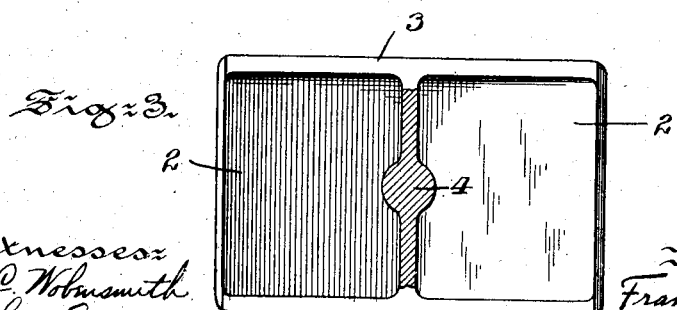
Witnesses:
Jas. C. Wobensmith
S. G. Doyle
Inventor:
Frank Bevan,
By Walter C. Pusey
Attorney

UNITED STATES PATENT OFFICE.

FRANK BEVAN, OF ARDMORE, PENNSYLVANIA, ASSIGNOR TO WILLIAM E. BEVAN, OF ARDMORE, PENNSYLVANIA.

CORNER-JOINT FOR CAR-FRAMES AND THE LIKE.

No. 834,103.     Specification of Letters Patent.     Patented Oct. 23, 1906.

Application filed February 13, 1906. Serial No. 300,857.

*To all whom it may concern:*

Be it known that I, FRANK BEVAN, a citizen of the United States, residing at Ardmore, in the county of Montgomery, State of Pennsylvania, have invented certain new and useful Improvements in Corner-Joints for Car-Frames and the Like, of which the following is a full, clear, and exact description, reference being had to the accompanying drawings, of which—

Figure 1 is a plan view of a corner of a car-frame, showing my invention applied thereto. Fig. 2 is an end view of Fig. 1 looking toward the brace-piece. Fig. 3 is a section on line $xx$, Fig. 1.

The object of this invention is to provide a strong and efficient corner-joint support or brace for frames of cars, car-trucks, automobiles, or other frames that are subjected to great strains, and which corner-joint support can be readily applied.

To this end the invention, broadly considered, comprises a metal box adapted to incase the adjacent ends of the corner-pieces of a car or similar frame from which projects a stem or shank that passes through an opening in a brace-piece within the corner, which brace-piece extends between the corner-pieces at a distance from the corner-joint and is secured thereto, the said stem or shank being clamped to said brace-piece by a nut or the like on the screw-threaded free end of said shank or stem.

In the drawings, 1 1 are two of the usual wooden pieces forming the frame of a car, car-truck, or the like and which meet to form a corner. The ends of these pieces 1 are inserted in and entirely incased by sockets 2 of a box 3. Projecting inwardly from the box 3 is a stem or shank 4, whose free end is screw-threaded and passes through a hole 5, through a brace-piece 6 of suitable metal. Said brace-piece 6 extends between the frame-piece 1 1 a suitable distance from the corner and by means of bolts 7 is secured thereto. The stem or shank 4 is secured to the brace-piece 6 by a nut 8, screwed on to said shank and bearing against the outer side of the brace-piece.

When my invention is applied to a corner of a car-truck or automobile frame, it will be observed that the adjacent corner-forming ends of the wooden frame-pieces are entirely incased within the sockets of the box 3, thereby not permitting movement in any direction of the said ends of these pieces. Also the brace-piece 6 being secured to the pieces 1 at some distance from the corner prevents any tendency to vertical movement of the wooden pieces 1. Thus the whole structure forms a very strong and efficient corner-joint. Also if there should be any tendency of the adjacent corner-forming ends of the pieces 1 to spread, by tightening the nut 8 the same may be prevented.

Having thus described my invention, I claim as new and desire to secure by Letters Patent—

1. A corner-joint support for car-frames and the like, comprising the combination of the box, entirely encasing the adjacent corner-forming ends of the car-frame, and having the stem extending inwardly therefrom, the brace-piece extending between, and rigidly secured to, said corner-forming ends of the car-frame at some distance from the junction of said ends, and means for securing said stem to said brace-piece, substantially as set forth.

2. A corner-joint support for car-frames and the like, comprising the combination of the box entirely encasing the adjacent corner-forming ends of the car-frame, the brace-piece extending between and rigidly secured to said corner-forming ends at some distance from the junction of said ends, the stem extending inwardly from said box and whose free end passes through an opening in said brace, and is screw-threaded on its said free end, and the nut on said free end, clamping said stem to said brace-piece, substantially as set forth.

In testimony whereof I have hereunto affixed my signature.

FRANK BEVAN.

Witnesses:
    E. W. MILLER,
    ANGIE L. MILLER.